United States Patent
Lu

(10) Patent No.: US 9,030,718 B1
(45) Date of Patent: May 12, 2015

(54) BOOK SCANNER

(71) Applicant: Foxlink Image Technology Co., Ltd., New Taipei (TW)

(72) Inventor: Pei Chun Lu, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 14/220,235

(22) Filed: Mar. 20, 2014

(51) Int. Cl.
*H04N 1/04* (2006.01)
*H04N 1/00* (2006.01)
*H04N 1/12* (2006.01)
*H04N 1/203* (2006.01)

(52) U.S. Cl.
CPC ......... *H04N 1/00525* (2013.01); *H04N 1/123* (2013.01); *H04N 1/00787* (2013.01); *H04N 1/2034* (2013.01); *H04N 1/00557* (2013.01); *H04N 2201/0434* (2013.01); *H04N 2201/0454* (2013.01)

(58) Field of Classification Search
CPC ............. H04N 2201/3274; H04N 2201/3276; H04N 2201/328; H04N 2201/3287; H04N 2201/3288; G06K 15/002; G06K 15/005; G06K 15/16; G06K 15/1822; G06K 15/1878; G06K 15/1882; G06K 15/402; G06K 19/0717
USPC ......... 358/474, 405, 412, 450, 470, 475, 498, 358/504, 505, 506, 518, 527, 540; 382/100, 382/174, 176, 181, 187, 190, 209, 290, 298, 382/301, 305; 399/361
See application file for complete search history.

(56) References Cited

U.S. PATENT DOCUMENTS

| | | | | |
|---|---|---|---|---|
| 5,583,607 A * | 12/1996 | Fujioka et al. | ................... | 355/25 |
| 5,610,720 A * | 3/1997 | Fujioka et al. | ................ | 358/296 |
| 5,689,348 A * | 11/1997 | Takahashi et al. | ............ | 358/475 |
| 5,751,446 A * | 5/1998 | Fujioka | .......................... | 358/474 |
| 5,798,841 A * | 8/1998 | Takahashi | ..................... | 358/296 |
| 6,574,014 B2 * | 6/2003 | Mandel et al. | ................ | 358/474 |
| 6,611,362 B2 * | 8/2003 | Mandel et al. | ................ | 358/474 |
| 7,595,915 B2 * | 9/2009 | Belkhir | ......................... | 358/474 |
| 8,351,090 B2 * | 1/2013 | Makino | .......................... | 358/474 |
| 8,451,516 B2 * | 5/2013 | Chen | ............................. | 358/497 |
| 8,885,233 B2 * | 11/2014 | Shen | ............................. | 358/498 |
| 2004/0047009 A1* | 3/2004 | Taylor et al. | ................... | 358/498 |
| 2008/0316551 A1* | 12/2008 | Taylor et al. | .................. | 358/498 |
| 2011/0267661 A1* | 11/2011 | Hayes et al. | .................... | 358/474 |
| 2013/0021654 A1* | 1/2013 | Ogawa et al. | ................. | 358/474 |
| 2014/0177011 A1* | 6/2014 | Hasegawa | ..................... | 358/474 |

* cited by examiner

*Primary Examiner* — Negussie Worku
(74) *Attorney, Agent, or Firm* — Lin & Associates IP, Inc.

(57) ABSTRACT

A book scanner includes a loading mechanism, a pickup mechanism, a page-turning mechanism, a page-pressing mechanism and an image capturing mechanism. The pickup mechanism is disposed at one end of the loading mechanism. The page-turning mechanism is disposed at the end of the loading mechanism. The page-turning mechanism includes a swing arm and a supporting arm. One end of the swing arm swings reciprocally and the other end of the swing arm is connected with the supporting arm. The supporting arm is capable of rotating into a gap between a ruckled uppermost page and the other pages of the book. The swing arm rotatably turns the ruckled uppermost page. The page-pressing mechanism is partially disposed above and facing the loading mechanism. The image capturing mechanism is disposed above and facing the loading mechanism.

11 Claims, 8 Drawing Sheets

US 9,030,718 B1

BOOK SCANNER

BACKGROUND OF THE INVENTION

1. Field of the Invention

The present invention generally relates to a book scanner, and more particularly to a book scanner capable of turning pages of a book to scan the pages of the book automatically and continuously.

2. The Related Art

Due to the advancement of science and technology, as long as there is one digital terminal, digital information needed by an individual person, including electronic books, can be taken away at any time and accessed easily.

Many old books and handwritten notebooks are reserved in ordinary people's homes, and are quite valuable for the individual person. If the old books and the handwritten notebooks can be digitalized, the old books and the handwritten notebooks will be reserved more easily and can be effectively applied through digitalized management.

A current book scanner is capable of turning pages of a book to scan the pages of the book automatically and continuously in the process of scanning images of the pages of the book. The images of the pages of the whole book can be captured to the digital information according to a page order. The book scanner generally includes a pickup mechanism, a page-pressing mechanism, a page-turning mechanism and an image capaturing mechanism.

However, the current book scanner has a larger occupying space and a higher cost on account of a volume of the page-turning mechanism being larger, the book scanner has no way to be popularized to the ordinary people that makes most of the book scanners are only limited to be used in few libraries or schools.

In view of this, in order to make the book scanner capable of being popularized, miniaturized and having a lower cost, so an innovative book scanner is provided by the present invention, the volume of the page-turning mechanism of the book scanner is smaller to make the book scanner have a smaller occupying space and the lower cost.

SUMMARY OF THE INVENTION

An object of the present invention is to provide a book scanner for turning pages of a book to scan the pages of the book automatically and continuously. The book scanner includes a loading mechanism for loading the book, a pickup mechanism, a page-turning mechanism, a page-pressing mechanism and an image capturing mechanism. The pickup mechanism is disposed at one end of the loading mechanism for ruckling the pages of the book. The page-turning mechanism is disposed at the end of the loading mechanism where the pickup mechanism is located, and adjacent to the pickup mechanism for turning the pages of the book. The page-turning mechanism includes a swing arm and a supporting arm. One end of the swing arm swings reciprocally and the other end of the swing arm is connected with the supporting arm. The supporting arm pivots the swing arm to rotate towards the loading mechanism reciprocally. The supporting arm is capable of rotating into a gap between a ruckled uppermost page and the other pages of the book. A rotating surface of the swing arm is substantially perpendicular to the pages of the book to make the swing arm rotatably turn the ruckled uppermost page. The page-pressing mechanism is partially disposed above and facing the loading mechanism for pressing against edges of the pages of the book so as to flatten the pages of the book. The image capturing mechanism is disposed above and facing the loading mechanism for capaturing images of the pages of the book.

As described above, the book scanner turns the pages of the book by virtue of the page-turning mechanism and the pickup mechanism, and processes of the page-turning mechanism and the pickup mechanism are shorter to decrease a volume of the book scanner so as to lower a cost of the book scanner. Thus, the book scanner can achieve purposes of having a smaller volume and a lower cost thereof. As a result, the book scanner is able to be popularized to the ordinary people so as to make the book scanners be widely used.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
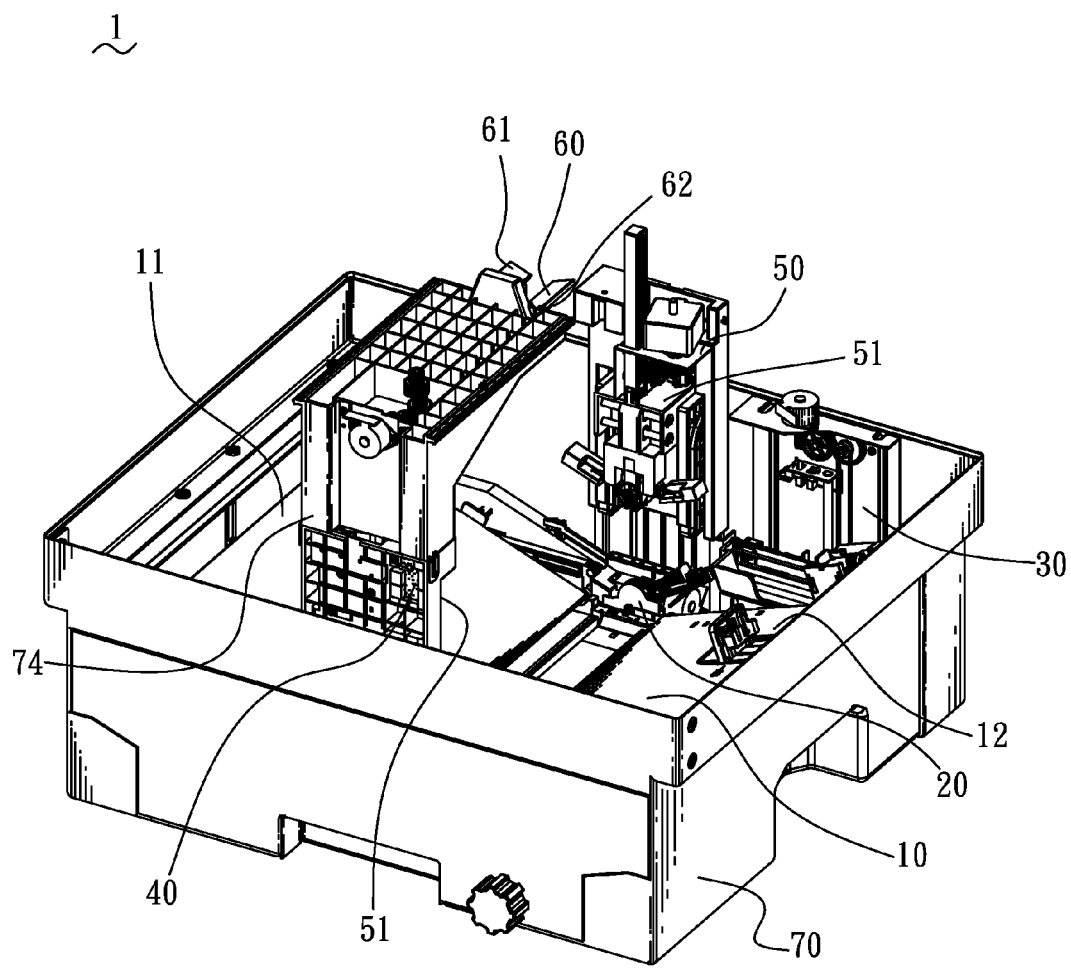
FIG. 1 is a perspective view of a book scanner in accordance with an embodiment of the present invention.

With reference to FIG. 1, a book scanner 1 in accordance with an embodiment of the present invention is shown. The book scanner 1 adapted for turning pages of a book (not shown) to scan the pages of the book automatically and continuously, includes a loading mechanism 10, a page-turning mechanism 20, a pickup mechanism 30, a control mechanism 40, a page-pressing mechanism 50, an image capturing mechanism 60 and a mechanical enclosure 70.

Referring to FIG. 1, the pickup mechanism 30 is disposed at one end of the loading mechanism 10 for ruckling the pages of the book. The page-turning mechanism 20 is disposed at the end of the loading mechanism 10 where the pickup mechanism 30 is located, and adjacent to the pickup mechanism 30 for turning the pages of the book. The page-pressing mechanism 50 is partially disposed above and facing the loading mechanism 10 for pressing against edges of the pages of the book so as to flatten the pages of the book. The image capturing mechanism 60 is disposed above and facing the loading mechanism 10 for capaturing images of the pages of the book. The control mechanism 40 is electrically connected with the loading mechanism 10, the page-turning mechanism 20, the pickup mechanism 30, the page-pressing mechanism 50 and the image capturing mechanism 60.

Referring to FIG. 1 again, the loading mechanism 10, the page-turning mechanism 20, the pickup mechanism 30, the page-pressing mechanism 50 and the image capturing mechanism 60 are disposed in the mechanical enclosure 70. The mechanical enclosure 70 is designated as a support for supporting the loading mechanism 10, the page-turning mechanism 20, the pickup mechanism 30, the page-pressing mechanism 50 and the image capturing mechanism 60.

Figure 2:
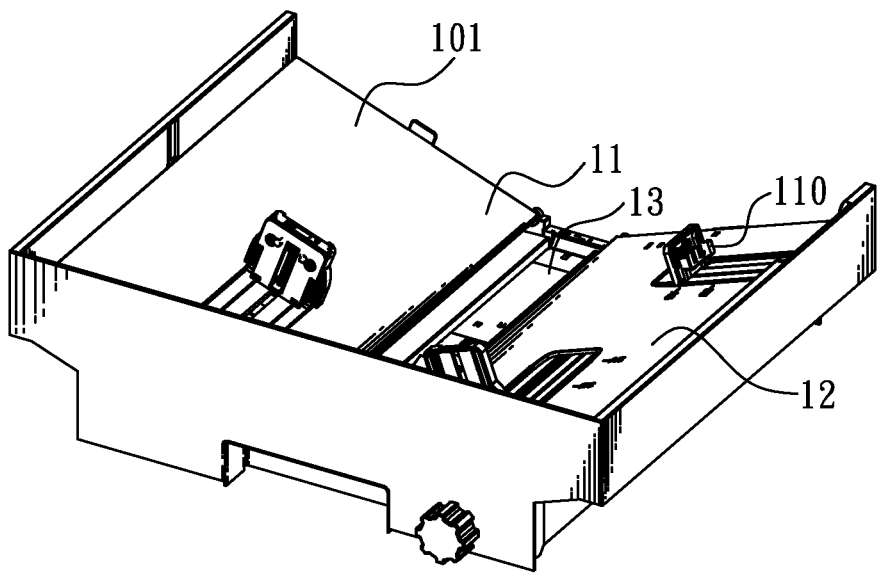
FIG. 2 is a perspective view of a loading mechanism of the book scanner of FIG. 1.

Referring to FIG. 1 and FIG. 2, the loading mechanism 10 for loading the book, includes a first loading board 11, a second loading board 12 and an adjustment mechanism 13. The first loading board 11 and the second loading board 12 are oppositely disposed to the adjustment mechanism 13. The first loading board 11 and the second loading board 12 are disposed spaced from each other. A distance between the first loading board 11 and the second loading board 12 is capable of being adjusted by the adjustment mechanism 13 to conform to a size of the book. Two inner sides of the first loading board 11 and the second loading board 12 are inclined downward to make two facing surfaces of the first loading board 11 and the second loading board 12 be shown an obtuse V shape from a side view. The two facing surfaces of the first loading board 11 and the second loading board 12 are designated as a book loading position 101. Each of the facing surfaces of the first loading board 11 and the second loading board 12 is equipped with at least one sensing paper guider 110. The sensing paper guider 110 is electrically connected with the control mechanism 40. The sensing paper guider 110 is capable of being moved along each of the facing surfaces of the first loading board 11 and the second loading board 12 to adjust a space among the sensing paper guiders 110 to conform to a size of the book. After the book is placed on the first loading board 11 and the second loading board 12, when the space among the sensing paper guiders 110 is adjusted to conform to the size of the book, the sensing paper guider 110 provides a signal to the control mechanism 40 to distinguish the size of the book.

Figure 3:
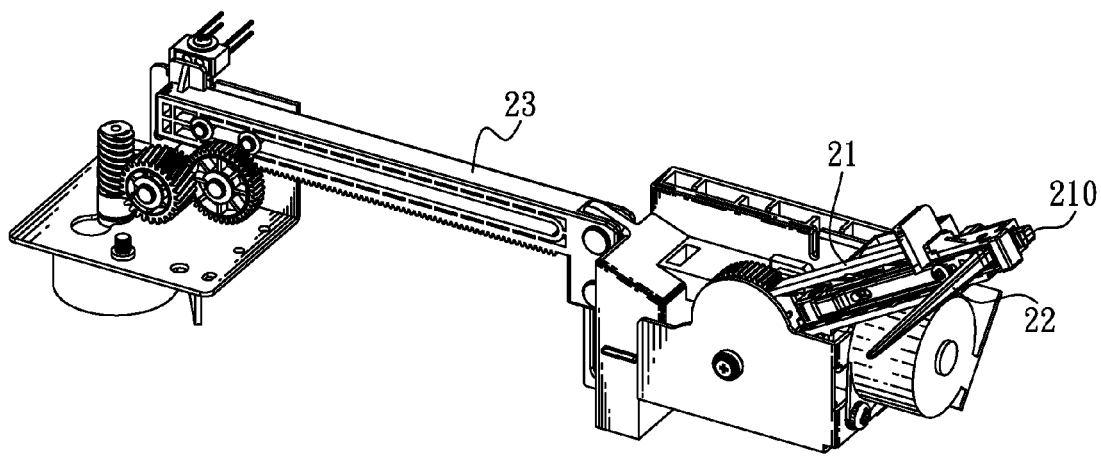
FIG. 3 is a perspective view of a page-turning mechanism of the book scanner of FIG. 1.

Referring to FIG. 1 and FIG. 3, the page-turning mechanism 20 includes a swing arm 21, a supporting arm 22 and a movable mechanism 23. The swing arm 21 is capable of being driven by a motor (not shown) or a pneumatic device (not shown) to make one end of the swing arm 21 swing reciprocally pivoting a pivoting point (not shown). The other end of the swing arm 21 is connected with the supporting arm 22 through a regulating portion 210. The regulating portion 210 controls the supporting arm 22 to pivot the swing arm 21 to rotate towards the loading mechanism 10 reciprocally. The swing arm 21 brings along the supporting arm 22 to move along one edge of the loading mechanism 10 adjacent to the page-turning mechanism 20 under the drive of the motor or the pneumatic device. The movable mechanism 23 is connected with the swing arm 21 and is capable of moving along a spreading direction of the book. So a process of the page-turning mechanism 20 is shorter.

Figure 4:
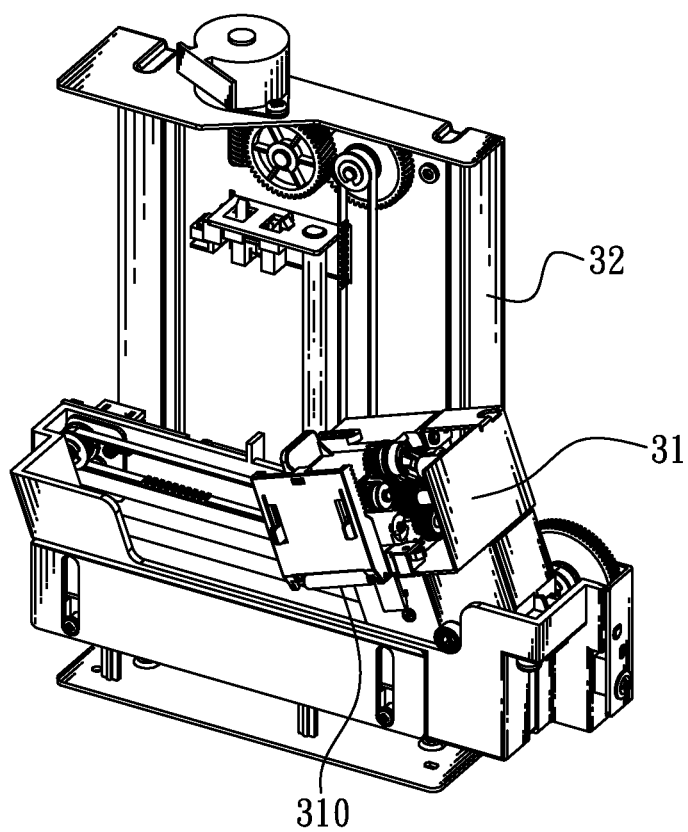
FIG. 4 is a perspective view of a pickup mechanism of the book scanner of FIG. 1.

Referring to FIG. 1, FIG. 2 and FIG. 4, the pickup mechanism 30 includes a picking assembly 31 and a displacement assembly 32. The picking assembly 31 has an adsorption surface 310 disposed at a bottom thereof for adsorbing an uppermost page of the book. The picking assembly 31 is connected with the displacement assembly 32, and the displacement assembly 32 controls a movement of the picking assembly 31. So a process of the pickup mechanism 30 is shorter. Specifically, the adsorption surface 310 adsorbs the uppermost page of the book and the displacement assembly 32 controls the picking assembly 31 to move to take along the uppermost page of the book located on the book loading position 101 of the loading mechanism 10 so as to make an edge of the uppermost page of the book adjacent to the picking assembly 31 ruckled and spaced from the other pages of the book to form a gap (not shown) therebetween.

Referring to FIG. 3 and FIG. 4, the supporting arm 22 is capable of rotating into the gap between the ruckled uppermost page and the other pages of the book. A rotating surface of the swing arm 21 is substantially perpendicular to the pages of the book to make the swing arm 21 rotatably turn the ruckled uppermost page.

Figure 5:
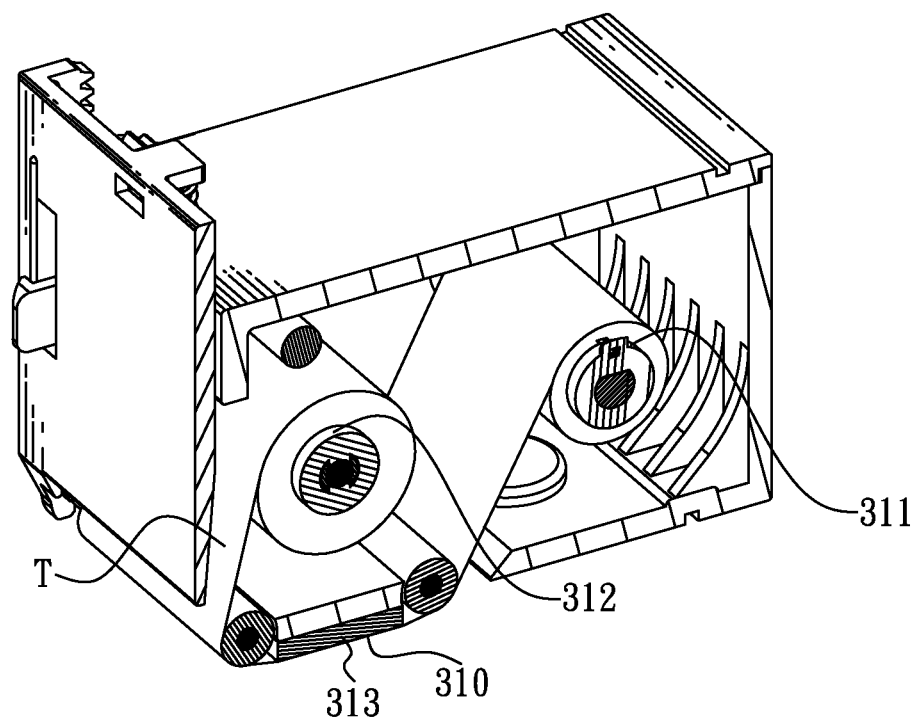
FIG. 5 is a perspective view of a picking assembly of the pickup mechanism of the book scanner of FIG. 4.

Referring to FIG. 4 and FIG. 5, in this embodiment, the adsorption surface 310 of the pickup mechanism 30 adsorbs the uppermost page of the book through adhesive glue. In order to keep a stickiness of the adhesive glue, the picking assembly 31 includes a picking shaft 311, a spreading shaft 312 and a bottom board 313. The picking assembly 31 is used for being assembled a glue roll T thereto. The spreading shaft 312 is disposed opposite to the picking shaft 311. The bottom board 313, the picking shaft 311 and the spreading shaft 312 are disposed to different levels.

The glue roll T is assembled to the spreading shaft 312, and the glue roll T is assembled to the picking shaft 311 after rounding the bottom board 313. A segment of the glue roll T is exposed to one side of the bottom board 313 and is acted as the adsorption surface 310 of the picking assembly 31. The picking shaft 311 and the spreading shaft 312 are capable of rolling the adhesive glue roll T to be under the bottom board 313 to keep a stickiness of the adsorption surface 310. The picking assembly 31 picks up the pages of the book through the adhesive way for effectively avoiding picking up the page in failure. The picking assembly 31 is not limited to this embodiment, in other embodiment, the picking assembly 31 can be chosen as an electrostatic adsorption device.

Referring to FIG. 1 and FIG. 2, the page-pressing mechanism 50 includes at least one pressing element 51. The pressing element 51 is partially disposed between the first loading board 11 and the second loading board 12, and facing to the book loading position 101 of the loading mechanism 10 for pressing against the edges of the pages of the book so as to flatten the pages of the book. In this embodiment, the page-pressing mechanism 50 includes two opposite pressing elements 51. The two pressing elements 51 are oppositely disposed to two opposite ends of the book loading position 101 of the loading mechanism 10, and facing to the book loading position 101 of the loading mechanism 10 for pressing against the edges of the pages of the book so as to flatten the pages of the book.

Figure 6:
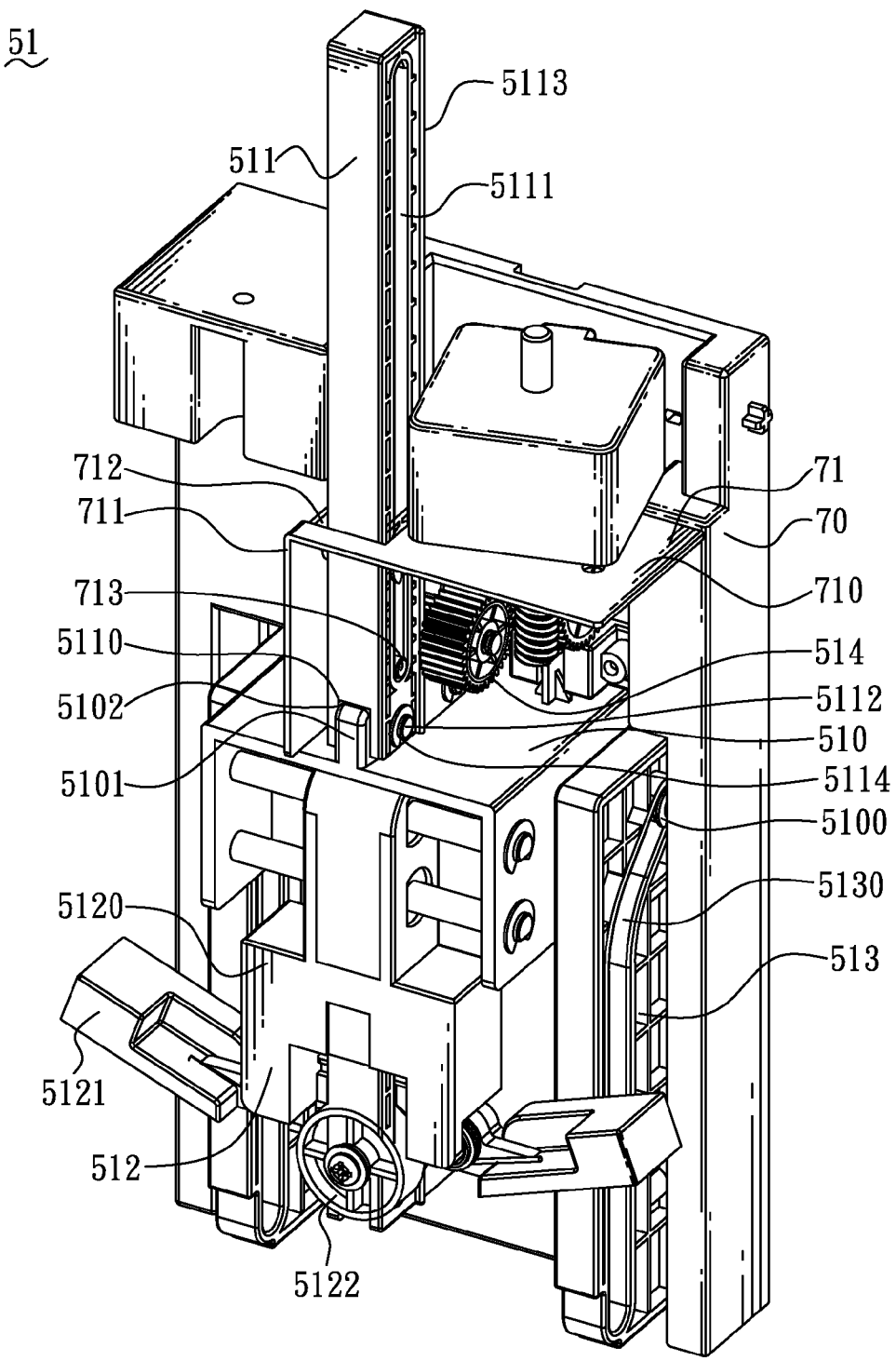
FIG. 6 is a perspective view of a page-pressing mechanism of the book scanner of FIG. 1.
Figure 7:
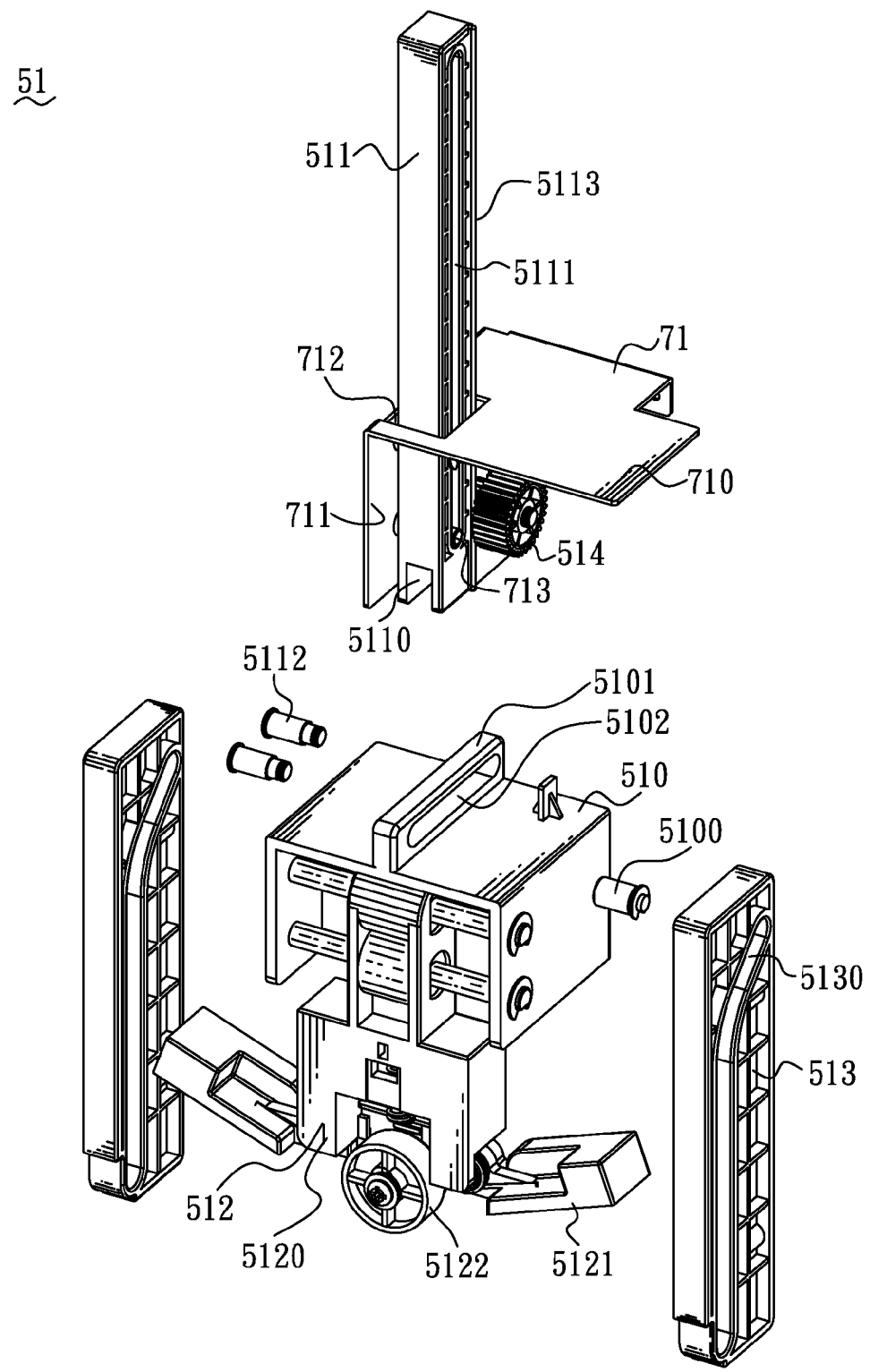
FIG. 7 is an exploded view of the page-pressing mechanism of the book scanner of FIG. 6.

Referring to FIG. 6 and FIG. 7, the pressing element 51 of the page-pressing mechanism 50 includes a moving portion 510, a transmitting portion 511, a pressing part 512, a pair of guiding blocks 513 and a gear 514. The pressing part 512 is disposed under the moving portion 510 for pressing against the edges of the pages of the book. The guiding blocks 513 are disposed on a left side and a right side of the moving portion 510. The transmitting portion 511 is disposed above the moving portion 510 for controlling the moving portion 510 and the pressing part 512 to slide along the guiding blocks 513.

Specifically, the moving portion 510 is of a substantial rectangular shape. The left side and the right side of the moving portion 510 are respectively connected with a sliding rod 5100. A top surface of the moving portion 510 protrudes upward, and then extends longitudinally to form a protruding board 5101. The protruding board 5101 defines a sliding slot 5102 transversely penetrating through a left surface and a right surface thereof. The transmitting portion 511 is of a substantially rectangular shape and is extended upward and downward. A bottom of the transmitting portion 511 is recessed inward to form a trough 5110 longitudinally penetrating therethrough and corresponding to the protruding board 5101. Each sidewall of the trough 5110 defines at least one fastening hole 5114. The fastening hole 5114 defined in one sidewall of the trough 5110 is corresponding to the fastening hole 5114 defined in the other sidewall of the trough 5110. The transmitting portion 511 defines a guiding slot 5111 extending upward and downward, and transversely penetrating therethrough. The protruding board 5101 is disposed in the trough 5110. The transmitting portion 511 further includes at least one sliding pillar 5112. The sliding pillar 5112 passes through the fastening holes 5114 and the sliding slot 5102 to fasten the protruding board 5101 of the moving portion 510 to the trough 5110. A rear surface of the transmitting portion 511 abreast defines a plurality of convex teeth 5113. The convex teeth 5113 are engaged with the gear 514. The transmitting portion 511 together with the moving portion 510 moves upward and downward by virtue of the convex teeth 5113 of the transmitting portion 511 engaging with the gear 514.

Referring to FIG. 6 and FIG. 7, a top of the mechanical enclosure 70 has a limiting piece 71. The limiting piece 71 has an assembling surface 710 and a guiding surface 711. The assembling surface 710 is disposed horizontally, and the guiding surface 711 is disposed vertically and perpendicular to the assembling surface 710. The assembling surface 710 defines an opening 712 vertically penetrating therethrough. The guiding surface 711 has at least one guiding rod 713 thereon and the transmitting portion 511 passes through the opening 712 to make the guiding rod 713 penetrate into the guiding slot 5111 so as to make the guiding rod 713 to move reciprocally along the extending direction of the guiding slot 5111 by virtue of the convex teeth 5113 of the transmitting portion 511 engaging with the gear 514.

Referring to FIG. 6, the pressing part 512 has a connecting portion 5120 mounted to a bottom of the moving portion 510. A left side and a right side of a bottom of the connecting portion 5120 are connected with a pair of elastic paper pressing arms 5121. A middle of the bottom of the connecting portion 5120 is equipped with a pressing roller 5122 located between the two elastic paper pressing arms 5121 for pressing against the pages of the book.

The guiding blocks 513 are respectively disposed on the left side and the right side of the moving portion 510, and is mounted to the mechanical enclosure 70. The guiding block 513 defines a guiding groove 5130 penetrating through a left surface and a right surface thereof and extending downward for a distance. The sliding rod 5100 of the moving portion 510 penetrates into the guiding groove 5130 to make the moving portion 510 slide along the guiding groove 5130.

When the transmitting portion 511 moves downward or upward under the drive of the gear 514, the pressing elements 51 make the pressing part 512 be able to slide along the process of the guiding groove 5130 by virtue of the protrusive board 5101 being fastened to the trough 5110 and the sliding rod 5100 being guided in the guiding groove 5130.

Referring to FIG. 1, the image capturing mechanism 60 includes at least one light-emitting unit 61 and at least one camera 62, the light-emitting unit 61 is disposed in the mechanical enclosure 70 for illuminating the loading mechanism 10. The camera 62 is disposed in the mechanical enclosure 70 and disposed facing the loading mechanism 10.

Figure 8:
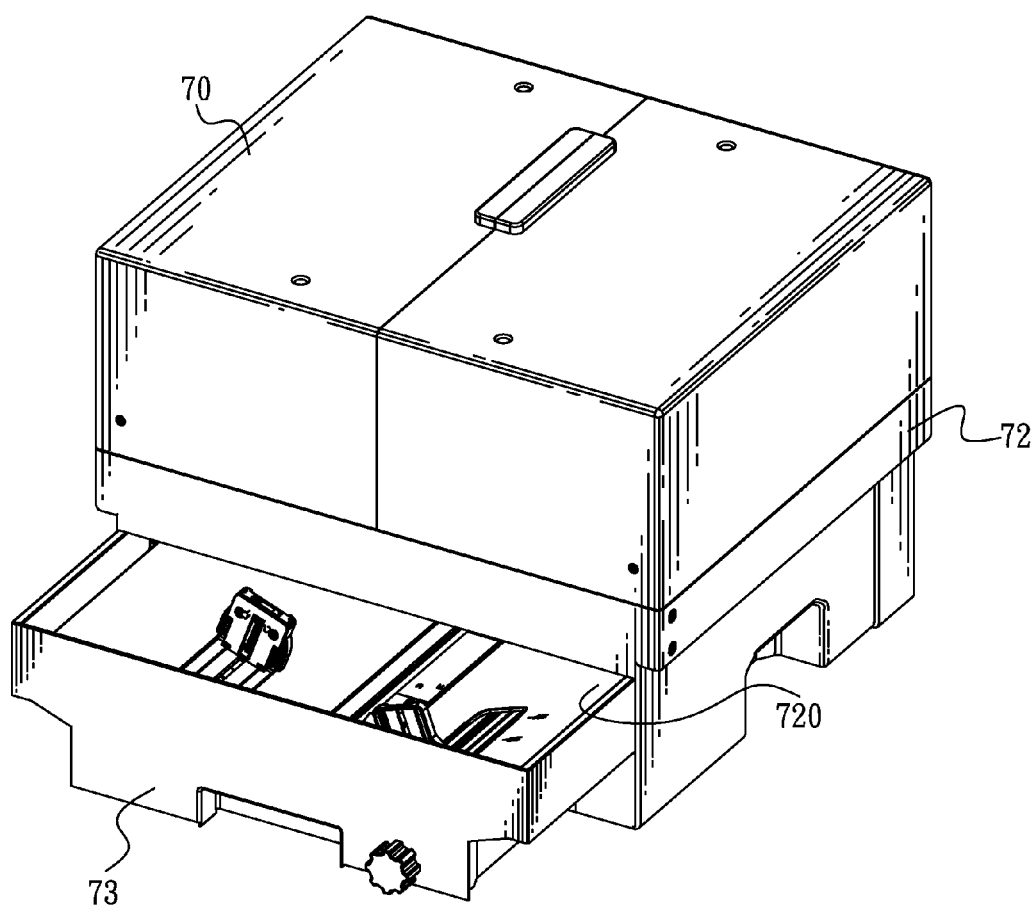
FIG. 8 is a perspective view of a mechanical enclosure of the book scanner of FIG. 1.

Referring to FIG. 1 and FIG. 8, in order to make the mechanical enclosure 70 achieve a darkroom effect, the mechanical enclosure 70 includes a hollow base body 72 and a drawer holder 73. The base body 72 defines a drawer hole 720. The drawer holder 73 is slidably disposed to the base body 72 through the drawer hole 720. The page-turning mechanism 20, the pickup mechanism 30, the page-pressing mechanism 50 and the image capturing mechanism 60 are disposed in the base body 72. The loading mechanism 10 is disposed in the drawer holder 73. The drawer holder 73 is withdrawn from the drawer holder 73 to place the book on the loading mechanism 10 by virtue of the loading mechanism 10 being disposed in the drawer holder 73.

Referring to FIG. 1, in order to make setting positions of the camera 62 and the page-pressing mechanism 50 be able to cooperate with the size of the book, the mechanical enclosure 70 further includes a slidably cradle 74 disposed therein. One pressing element 51 and the image capturing mechanism 60 are disposed to the cradle 74. The other pressing element 51 is disposed to an inner surface of the base body 72. The cradle 74 is driven by the motor, and is electrically connected with the control mechanism 40.

Referring to FIGS. 1-8, when book scanner 1 is in use, after the book is placed on the book loading position 101 of the loading mechanism 10, the sensing paper guider 110 is moved to adjust the space among the sensing paper guiders 110 to conform to the size of the book, when the book is placed and located in a proper position, the control mechanism 40 controls the cradle 74 under the drive of the motor to move to a proper position through the signal provided by the sensing paper guider 110 to cooperate with the size of the book.

A cycling actuation mode of the book scanner 1 is described as follows. Firstly, the pressing element 51 of the page-pressing mechanism 50 presses downward on the book, the camera 62 capatures an image of the uppermost page of the book at the moment, then the page-pressing mechanism 50 is raised up, the displacement assembly 32 of the pickup mechanism 30 controls the picking assembly 31 of the pickup mechanism 30 to move to make the adsorption surface 310 contact and adsorb one corner of the uppermost page of the book, and then, the displacement assembly 32 controls the picking assembly 31 to move towards a center of the uppermost page for a distance to take along the corner of the uppermost page of the book located on the book loading position 101 of the loading mechanism 10 so as to make the edge of the uppermost page of the book adjacent to the picking assembly 31 ruckled and spaced from the other pages of the book to form the gap therebetween. The pickup mechanism 30 returns to an original position thereof. Then, the swing arm 21 rotates to a proper angle and the supporting arm 22 is stretched out to make the supporting arm 22 project into the gap between the adsorbbed uppermost page and the other pages of the book, at last, the movable mechanism 23 and the swing arm 21 move towards a page turning direction to make the uppermost page turned. At last, the supporting arm 22 is taken back, and the movable mechanism 23 and the swing arm 21 returns to original positions thereof.

As described above, the book scanner 1 turns the pages of the book by virtue of the page-turning mechanism 20 and the pickup mechanism 30, and the processes of the page-turning mechanism 20 and the pickup mechanism 30 are shorter to decrease a volume of the book scanner 1 so as to lower a cost of the book scanner 1. Thus, the book scanner 1 can achieve purposes of having a smaller volume and a lower cost thereof. As a result, the book scanner 1 is able to be popularized to the ordinary people so as to make the book scanners 1 be widely used.

What is claimed is:

1. A book scanner for turning pages of a book to scan the pages of the book automatically and continuously, comprising:
   a loading mechanism for loading the book, the loading mechanism including a first loading board and a second loading board which are disposed spaced from each other, two facing surfaces of the first loading board and the second loading board being designated as a book loading position;

a pickup mechanism disposed at one end of the loading mechanism for ruckling the pages of the book;

a page-turning mechanism disposed at the end of the loading mechanism where the pickup mechanism is located, and adjacent to the pickup mechanism for turning the pages of the book, the page-turning mechanism including a swing arm and a supporting arm, one end of the swing arm swinging reciprocally and the other end of the swing arm being connected with the supporting arm, the supporting arm pivoting the swing arm to rotate towards the loading mechanism reciprocally, the supporting arm being capable of rotating into a gap between a ruckled uppermost page and the other pages of the book, a rotating surface of the swing arm being substantially perpendicular to the pages of the book to make the swing arm rotatably turn the ruckled uppermost page;

a page-pressing mechanism partially disposed above and facing the loading mechanism for pressing against edges of the pages of the book so as to flatten the pages of the book, the page-pressing mechanism including at least one pressing element, the pressing element being partially disposed between the first loading board and the second loading board, and facing to the book loading position of the loading mechanism for pressing against the edges of the pages of the book located on the book loading position so as to flatten the pages of the book; and an image capturing mechanism disposed above and facing the loading mechanism for capturing images of the pages of the book;

wherein the pressing element of the page-pressing mechanism includes a moving portion, a transmitting portion, a pressing part, a pair of guiding blocks and a gear, the pressing part is disposed under the moving portion for pressing against the pages of the book, the guiding blocks are disposed on a left side and a right side of the moving portion, and the transmitting portion is disposed above the moving portion for controlling the moving portion and the pressing part to slide along the guiding blocks.

2. The book scanner as claimed in claim 1, wherein the page-turning mechanism further includes a movable mechanism which is connected with the swing arm and is capable of moving along a spreading direction of the book.

3. The book scanner as claimed in claim 1, wherein the page-pressing mechanism includes two pressing elements, the two pressing elements are oppositely disposed to two opposite ends of the book loading position of the loading mechanism and facing to the book loading position of the loading mechanism for pressing against the edges of the pages of the book located on the book loading position so as to flatten the pages of the book.

4. The book scanner as claimed in claim 1, wherein the moving portion is of a substantial rectangular shape, the left side and the right side of the moving portion are respectively connected with a sliding rod, a top surface of the moving portion protrudes upward, and then extends longitudinally to form a protruding board, the protruding board defines a sliding slot transversely penetrating through a left surface and a right surface thereof, a bottom of the transmitting portion is recessed inward to form a trough longitudinally penetrating therethrough and corresponding to the protruding board, each sidewall of the trough defines at least one fastening hole, the fastening hole defined in one sidewall of the trough is corresponding to the fastening hole defined in the other sidewall of the trough, the transmitting portion defines a guiding slot extending upward and downward, and transversely penetrating therethrough, the protruding board is disposed in the trough, the transmitting portion further includes at least one sliding pillar, and the sliding pillar passes through the fastening holes and the sliding slot to fasten the protruding board of the moving portion to the trough.

5. The book scanner as claimed in claim 4, wherein a rear surface of the transmitting portion abreast defines a plurality of convex teeth, the convex teeth are engaged with the gear, and the transmitting portion together with the moving portion moves upward and downward by virtue of the convex teeth of the transmitting portion engaging with the gear.

6. The book scanner as claimed in claim 1, further comprising a mechanical enclosure, the loading mechanism, the page-turning mechanism, the pickup mechanism, the page-pressing mechanism and the image capturing mechanism being disposed in the mechanical enclosure.

7. The book scanner as claimed in claim 6, wherein the mechanical enclosure includes a hollow base body and a drawer holder, the base body defines a drawer hole, the drawer holder is slidably disposed to the base body through the drawer hole, the page-turning mechanism, the pickup mechanism, the page-pressing mechanism and the image capturing mechanism are disposed in the base body, and the loading mechanism is disposed in the drawer holder.

8. The book scanner as claimed in claim 6, wherein the page-pressing mechanism includes two pressing elements, the mechanical enclosure includes a base body and a slidably cradle, one pressing element and the image capturing mechanism are disposed to the cradle, and the other pressing element is disposed to an inner surface of the base body.

9. The book scanner as claimed in claim 1, wherein the pickup mechanism includes a picking assembly and a displacement assembly, the picking assembly has an adsorption surface disposed at a bottom thereof for adsorbing an uppermost page of the book, the picking assembly is connected with the displacement assembly, and the displacement assembly controls a movement of the picking assembly.

10. A book scanner for turning pages of a book to scan the pages of the book automatically and continuously, comprising:

a loading mechanism for loading the book, the loading mechanism including a first loading board and a second loading board which are disposed spaced from each other, two facing surfaces of the first loading board and the second loading board being designated as a book loading position;

a pickup mechanism disposed at one end of the loading mechanism for ruckling the pages of the book;

a page-turning mechanism disposed at the end of the loading mechanism where the pickup mechanism is located, and adjacent to the pickup mechanism for turning the pages of the book, the page-turning mechanism including a swing arm and a supporting arm, one end of the swing arm swinging reciprocally and the other end of the swing arm being connected with the supporting arm, the supporting arm pivoting the swing arm to rotate towards the loading mechanism reciprocally, the supporting arm being capable of rotating into a gap between a ruckled uppermost page and the other pages of the book, a rotating surface of the swing arm being substantially perpendicular to the pages of the book to make the swing arm rotatably turn the ruckled uppermost page;

a page-pressing mechanism partially disposed above and facing the loading mechanism for pressing against edges of the pages of the book so as to flatten the pages of the book, the page-pressing mechanism including at least one pressing element, the pressing element being partially disposed between the first loading board and the second loading board, and facing to the book loading position of the loading mechanism for pressing against the edges of the pages of the book located on the book loading position so as to flatten the pages of the book; and an image capturing mechanism disposed above and facing the loading mechanism for capturing images of the pages of the book;

wherein the loading mechanism further includes an adjustment mechanism, the first loading board and the second loading board are oppositely disposed to the adjustment mechanism, and a distance between the first loading board and the second loading board is adjustable by the adjustment mechanism to conform to a size of the book.

11. A book scanner for turning pages of a book to scan the pages of the book automatically and continuously, comprising:

a loading mechanism for loading the book, the loading mechanism including a first loading board and a second loading board which are disposed spaced from each other, two facing surfaces of the first loading board and the second loading board being designated as a book loading position;

a pickup mechanism disposed at one end of the loading mechanism for ruckling the pages of the book;

a page-turning mechanism disposed at the end of the loading mechanism where the pickup mechanism is located, and adjacent to the pickup mechanism for turning the pages of the book, the page-turning mechanism including a swing arm and a supporting arm, one end of the swing arm swinging reciprocally and the other end of the swing arm being connected with the supporting arm, the supporting arm pivoting the swing arm to rotate towards the loading mechanism reciprocally, the supporting arm being capable of rotating into a gap between a ruckled uppermost page and the other pages of the book, a rotating surface of the swing arm being substantially perpendicular to the pages of the book to make the swing arm rotatably turn the ruckled uppermost page;

a page-pressing mechanism partially disposed above and facing the loading mechanism for pressing against edges of the pages of the book so as to flatten the pages of the book, the page-pressing mechanism including at least one pressing element, the pressing element being partially disposed between the first loading board and the second loading board, and facing to the book loading position of the loading mechanism for pressing against the edges of the pages of the book located on the book loading position so as to flatten the pages of the book; and an image capturing mechanism disposed above and facing the loading mechanism for capturing images of the pages of the book;

wherein each of the facing surfaces of the first loading board and the second loading board is equipped with at least one sensing paper guider, and the sensing paper guider is movable along each of the facing surfaces of the first loading board and the second loading board to adjust a space among the sensing paper guiders to conform to a size of the book.

* * * * *